(12) United States Patent
Lin (10) Patent No.: US 7,255,370 B2
(45) Date of Patent: Aug. 14, 2007

(54) VEHICLE CHASSIS HAVING A LOCKING DEVICE FOR SECURING CONNECTION BETWEEN FIRST AND SECOND CHASSIS MEMBERS

(75) Inventor: Samuel Lin, Chia Yi Hsien (TW)

(73) Assignee: Sunpex Technology Co., Ltd., Chia Yi (TW)

( * ) Notice: Subject to any disclaimer, the term of this patent is extended or adjusted under 35 U.S.C. 154(b) by 654 days.

(21) Appl. No.: 10/648,907

(22) Filed: Aug. 27, 2003

(65) Prior Publication Data

US 2005/0046167 A1 Mar. 3, 2005

(51) Int. Cl.
*B62D 21/12* (2006.01)
(52) U.S. Cl. .................................... 280/785; 280/149.2
(58) Field of Classification Search ................ 180/311; 280/287, 785, 149.2, 491.1; 292/300–304; 403/150
See application file for complete search history.

(56) References Cited

U.S. PATENT DOCUMENTS

| | | | | |
|---|---|---|---|---|
| 2,849,248 A | * | 8/1958 | Allen | ......................... 403/150 |
| 5,348,333 A | * | 9/1994 | Gee | ......................... 280/491.5 |
| 5,807,047 A | * | 9/1998 | Cox | ......................... 410/152 |
| 6,089,343 A | * | 7/2000 | Brewer | ......................... 180/311 |
| 6,105,469 A | * | 8/2000 | Gracy | ......................... 81/45 |
| 6,145,865 A | * | 11/2000 | Cannara et al. | ............. 280/507 |
| 6,199,894 B1 | * | 3/2001 | Anderson | ................... 280/638 |
| 6,336,517 B1 | * | 1/2002 | Cheng | ......................... 180/208 |
| 6,511,250 B2 | * | 1/2003 | Lindsay | ...................... 403/230 |
| 6,550,798 B2 | * | 4/2003 | MacKarvich | ............ 280/149.2 |
| 6,581,954 B2 | * | 6/2003 | Chadwick | ................ 280/491.1 |
| 2004/0064921 A1 | * | 4/2004 | Mittleider | ................ 24/68 CT |

* cited by examiner

*Primary Examiner*—Paul N. Dickson
*Assistant Examiner*—Laura B. Rosenberg
(74) *Attorney, Agent, or Firm*—McNees Wallace & Nurick LLC (57) ABSTRACT

A vehicle chassis includes first and second chassis members, and a locking device. Each of the first and second chassis members includes a connector formed with a hole unit therethrough. The locking device includes a locking pin that extends through the hole units in the connectors, and a resilient retainer that latches releasably to one end of the locking pin.

8 Claims, 9 Drawing Sheets

VEHICLE CHASSIS HAVING A LOCKING DEVICE FOR SECURING CONNECTION BETWEEN FIRST AND SECOND CHASSIS MEMBERS

BACKGROUND OF THE INVENTION

1. Field of the Invention

The invention relates to a vehicle chassis, more particularly to a vehicle chassis having a locking device for securing connection between first and second chassis members.

2. Description of the Related Art

A conventional vehicle chassis includes first and second chassis members, and a locking device. The first chassis member includes a connector formed with a threaded hole therethrough. The second chassis member includes a connector formed with a through hole therethrough. The locking device includes a screw fastener passing through the through hole and threaded through the threaded hole in order to interconnect the first and second connectors.

Although the locking device of the conventional vehicle chassis achieves the purpose of interconnecting the first and second chassis members, there are certain drawbacks associated with the locking device of the conventional vehicle chassis. One drawback is that it requires a significant amount of time to thread the screw fastener in order to interconnect the first and second chassis members. Another drawback is that it is also time-consuming to remove the screw fastener in order to disconnect the first chassis member from the second chassis member.

SUMMARY OF THE INVENTION

Therefore, the object of the present invention is to provide a vehicle chassis that has a locking device which permits easy and rapid connection and disconnection of first and second chassis members of the vehicle chassis so as to overcome the aforesaid drawbacks of the prior art.

According to the present invention, a vehicle chassis comprises first and second chassis members, and a locking device. The first chassis member includes a first connector formed with a hole unit therethrough. The second chassis member includes a second connector formed with a hole unit therethrough. The second connector is disposed on the first connector when the first and second chassis members are brought toward each other to align the hole units in the first and second connectors. The locking device includes a locking pin and a resilient retainer. The locking pin has a head end and a tail end opposite to the head end of the locking pin, and extends through the hole units in the first and second connectors. The resilient retainer has a first end connected pivotally to the head end of the locking pin, and a second end opposite to the first end of the retainer and latched releasably to the tail end of the locking pin.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 1:
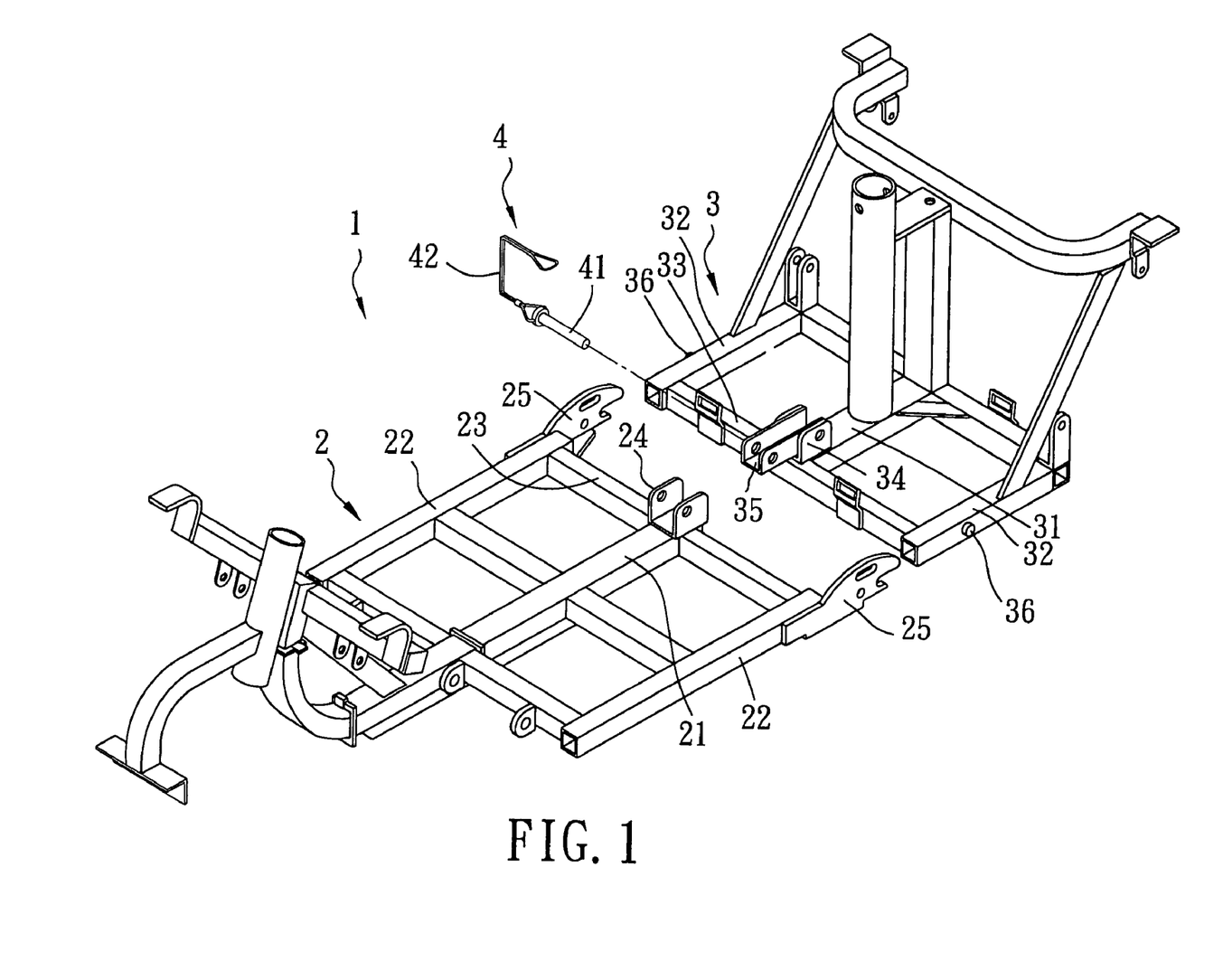
FIG. 1 is an exploded perspective view of the first preferred embodiment of a vehicle chassis according to the present invention.
Figure 2:
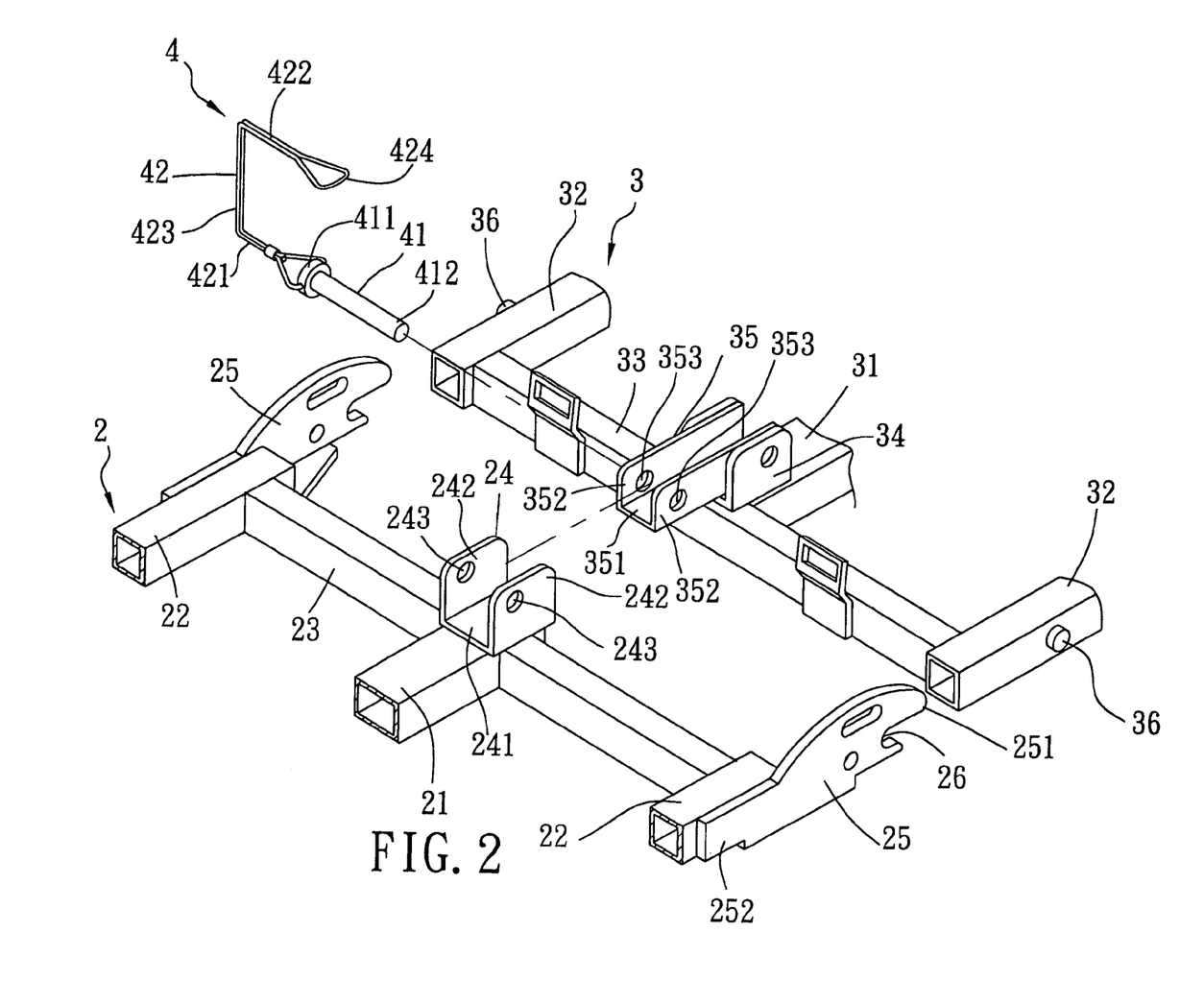
FIG. 2 is a fragmentary exploded perspective view of the first preferred embodiment.

Referring to FIGS. 1 and 2, the first preferred embodiment of a vehicle chassis 1 according to this invention is shown to include first and second chassis members 2, 3, and a locking device 4.

The vehicle chassis 1 has front and rear end portions. The first and second chassis members 2, 3 are disposed respectively on the front and rear end portions of the vehicle chassis 1.

The first chassis member 2 includes a first connector 24. In this embodiment, the first connector 24 is generally U-shaped. In particular, the first connector 24 has an accommodating space that opens upwardly, is defined by a pair of vertical walls 242 and a horizontal wall 241 that interconnects the vertical walls 242 of the first connector 24, and is formed with a hole unit 243 therethrough. The hole unit 243 includes an aligned pair of holes formed respectively in the vertical walls 242 of the first connector 24.

The first chassis member 2 further includes a pair of left and right side rails 22, and a horizontal bar 21 disposed between and parallel to the side rails 22 of the first chassis member 2. Each of the side rails 22 and the horizontal bar 21 of the first chassis member 2 has first and second ends that are respectively distal from and proximate to the rear end portion of the vehicle chassis 1.

The first chassis member 2 further includes a crossbar 23 that interconnects the second ends the side rails 22 and the horizontal bar 21 of the first chassis member 2. The horizontal wall 241 of the first connector 24 is fixed on a middle portion of the crossbar 23 of the first chassis member 2, such as by welding.

The second chassis member 3 includes a second connector 35. In this embodiment, like the first connector 24, the second connector 35 is generally U-shaped. In particular, the second connector 35 is defined by a pair of vertical walls 352 and a horizontal wall 351 that interconnects the vertical walls 352 of the second connector 35, and is formed with a hole unit 353 therethrough. The hole unit 353 includes an aligned pair of holes formed respectively in the vertical walls 352 of the second connector 35.

The second chassis member 3 further includes a pair of left and right side rails 32, and a horizontal bar 31 disposed between and parallel to the side rails 32 of the second chassis member 3. Each of the side rails 32 and the horizontal bar 31 of the second chassis member 3 has first and second ends that are respectively distal from and proximate to the front end portion of the vehicle chassis 1.

The second chassis member 3 further includes a crossbar 33 that interconnects the second ends of the side rails 32 and the horizontal bar 31 of the second chassis member 3. A generally U-shaped coupler 34 is fixed on the second end of the horizontal bar 31 of the second chassis member 3, such as by welding. The second connector 35 has a first end portion that is mounted fixedly in an accommodating space of the coupler 34, and a second end portion that extends from the second chassis member 3 toward the front end portion of the vehicle chassis 1. It is noted that the hole unit 353 is formed in the second end portion of the second connector 35. Further, the second connector 35 and the coupler 34 may be formed integrally.

The locking device 4 includes a locking pin 41 and a resilient retainer 42. The locking pin 41 has a head end 411 and a tail end 412 opposite to the head end 411 of the locking pin 41. The retainer 42 is generally U-shaped, and has a pair of spaced apart first and second leg sections 421, 422, each of which has a first end and a second end opposite to the first end of the respective one of the first and second leg sections 421, 422, and an intermediate leg section 423 that interconnects the first ends of the first and second leg sections 421, 422. The second end of the first leg section 421 of the retainer 42 is connected pivotally to the head end 411 of the locking pin 41. The second end of the second leg section 422 of the retainer 42 is formed into a loop 424. It is noted that the space between the first and second leg sections 421, 422 of the retainer 42 is shorter than the length of the locking pin 41.

The first chassis member 2 further includes a pair of connecting plates 25 disposed respectively on the left and right side rails 22 of the first chassis member 2. In particular, each of the connecting plates 25 has a first end portion 252 that is mounted fixedly on a respective one of the left and right side rails 22, and a second end portion 251 that extends from the first chassis member 2 toward the rear end portion of the vehicle chassis 1.

The vehicle chassis 1 further comprises groove and projection units 26, 36. The groove unit 26 includes a pair of grooves, each of which is formed in the second end portion 251 of a respective one of the connecting plates 25 of the first chassis member 2. The projection unit 36 includes a pair of projections formed respectively on the left and right side rails 32 of the second chassis member 3.

Figure 3:
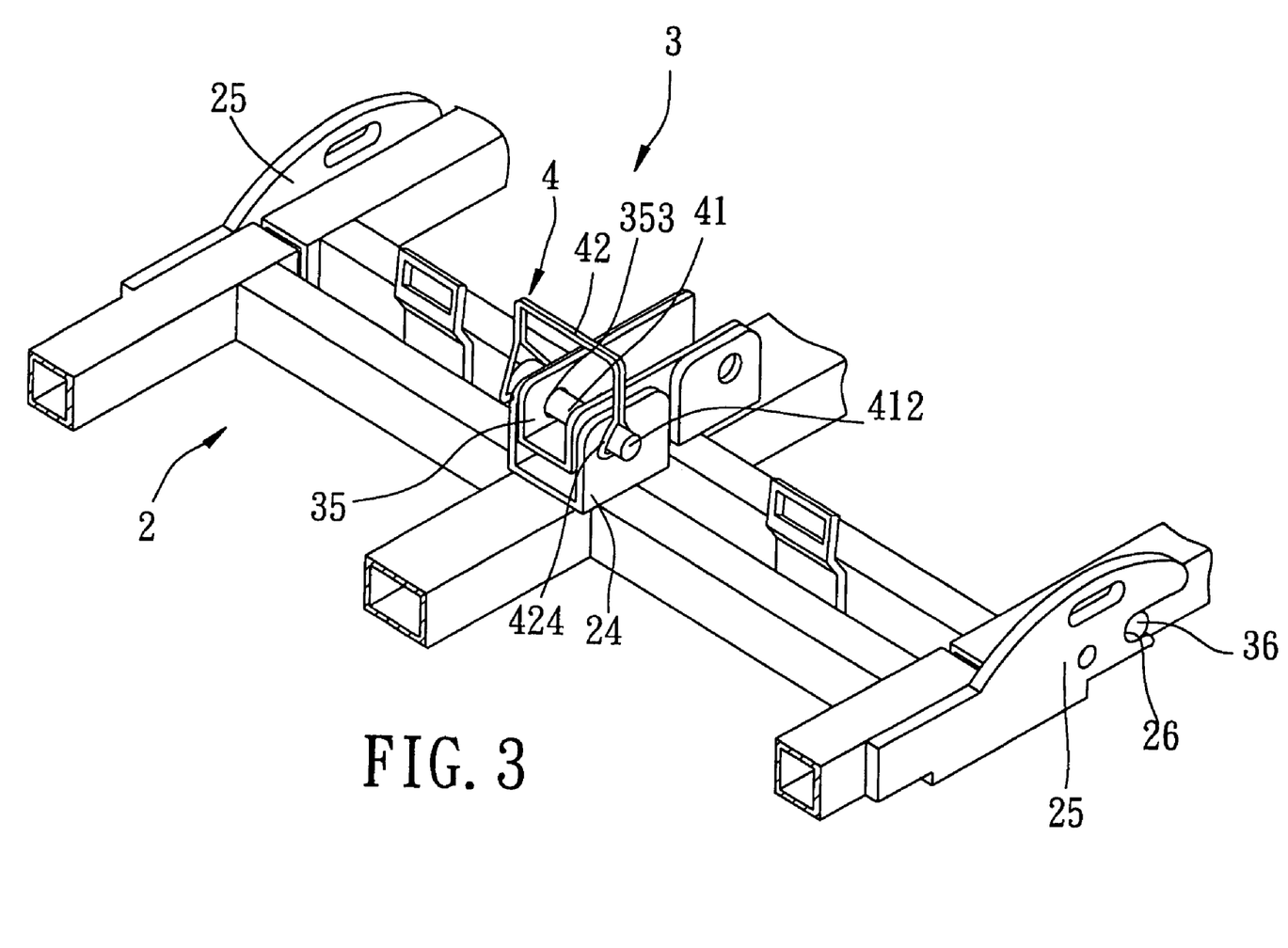
FIG. 3 is a fragmentary perspective view of the first preferred embodiment in an assembled state.
Figure 4:
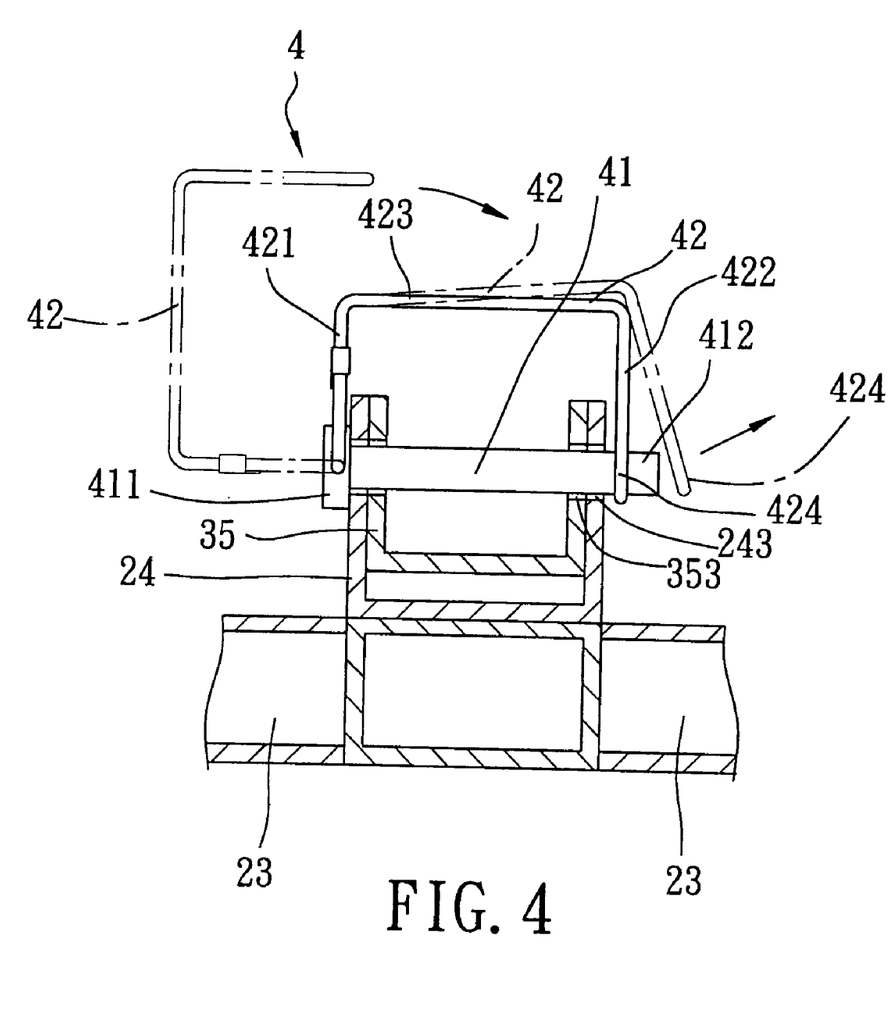
FIG. 4 is a fragmentary sectional view to illustrate a locking device of the first preferred embodiment.

With further reference to FIGS. 3 and 4, when it is desired to connect the first and second chassis members 2, 3, the first and second chassis members 2, 3 are brought toward each other such that the projection unit 36 is received in the groove unit 26, and such that the second end portion of the second connector 35 is received in the accommodating space of the first connector 24, as best shown in FIG. 3. Thereafter, the hole unit 353 (see FIG. 2) in the vertical walls 352 of the second connector 35 is aligned with the hole unit 243 (see FIG. 2) in the vertical walls 242 of the first connector 24. Once the hole units 243, 353 are aligned, the locking pin 41 is extended through the hole units 243, 353. At this time, as best shown in FIG. 4, the second leg section 422 of the retainer 42 is rotated toward the tail end 412 of the locking pin 41, is pulled away from the first leg section 421 of the retainer 42 such that the space between the first and second leg sections 421, 422 exceeds the length of the locking pin 41, is further rotated until the loop 424 of the second leg section 422 is registered with the tail end 412, and is sleeved on the tail end 412 so as to latch releasably the second leg section 422 of the retainer 42 to the tail end 412 of the locking pin 41.

Accordingly, when it is desired to disconnect the first and second chassis members 2, 3, the second leg section 422 is pulled away from the first leg section 421 such that the tail end 412 ceases to extend into the loop 424, is rotated to misalign the loop 424 from the tail end 412, and is released to unlatch the second leg section 422 of the retainer 42 from the tail end 412 of the locking pin 41. Once the retainer 42 is unlatched from the locking pin 41, the locking pin 41 is pulled out from the hole units 243, 353 so as to permit disassembling of the first and second chassis members 2, 3.

Figure 5:
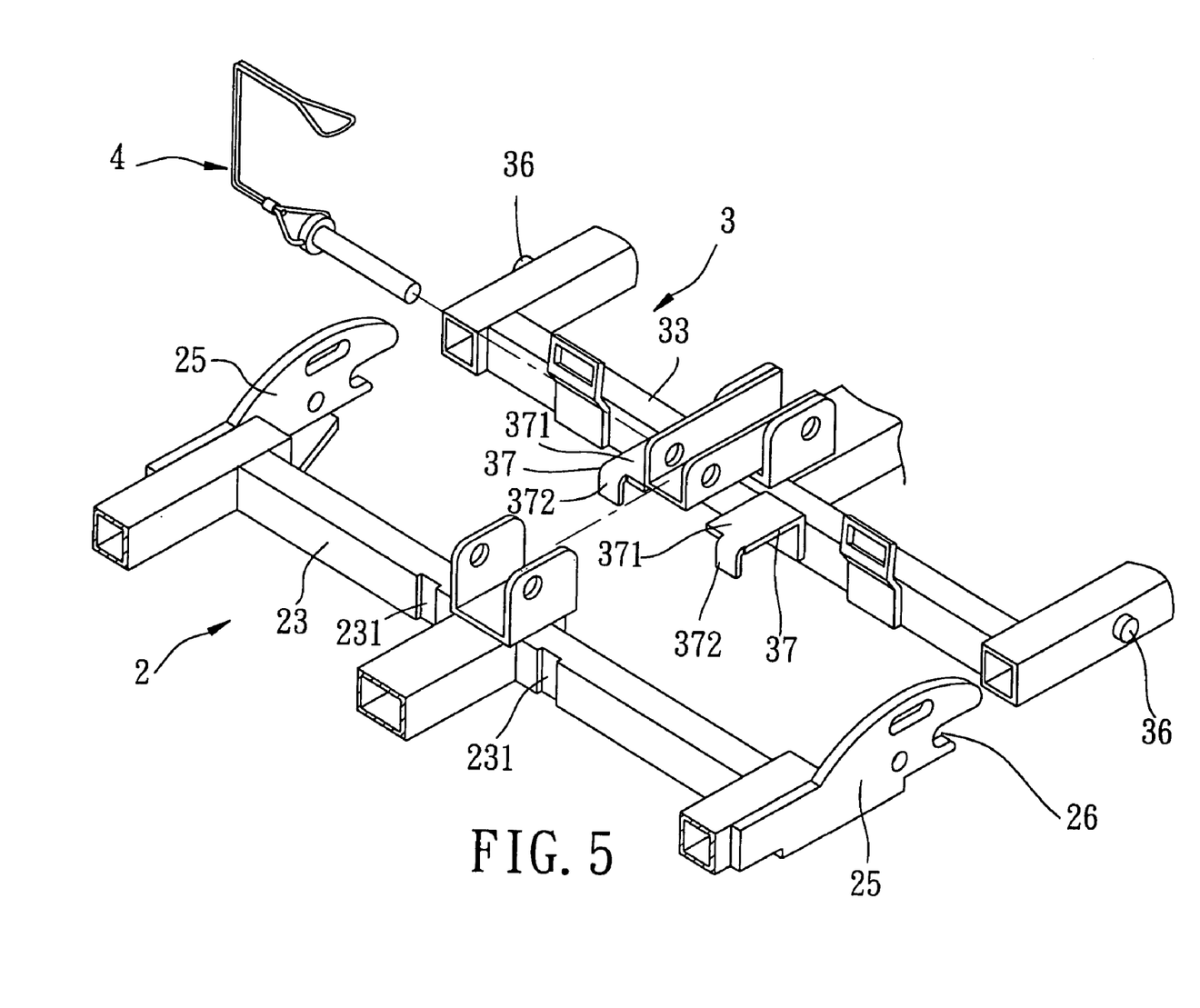
FIG. 5 is a fragmentary exploded perspective view of the second preferred embodiment of a vehicle chassis according to the present invention.

FIG. 5 shows the second preferred embodiment of a vehicle chassis according to this invention. This embodiment differs from the first embodiment in that the vehicle chassis further comprises hook and notch units.

The hook unit includes a pair of hook connectors 37 fixed respectively on left and right portions of the crossbar 23 of the second chassis member 3. In particular, each of the hook connectors 37 includes horizontal and vertical leg sections 371, 372. The horizontal leg section 371 has a first end portion that is fixed on a respective one of the left and right portions of the crossbar 23, and a second end portion that extends from the first end portion of the horizontal leg section 371 toward the front end portion of the vehicle chassis 1. The vertical leg section 372 extends downwardly from the second end portion of the horizontal leg section 371.

The notch unit includes a pair of notches 231 formed respectively in left and right portions of the crossbar 23 of the first chassis member 2. Each of the notches 231 corresponds to the vertical leg section 372 of a respective one of the hook connectors 37.

Figure 6:
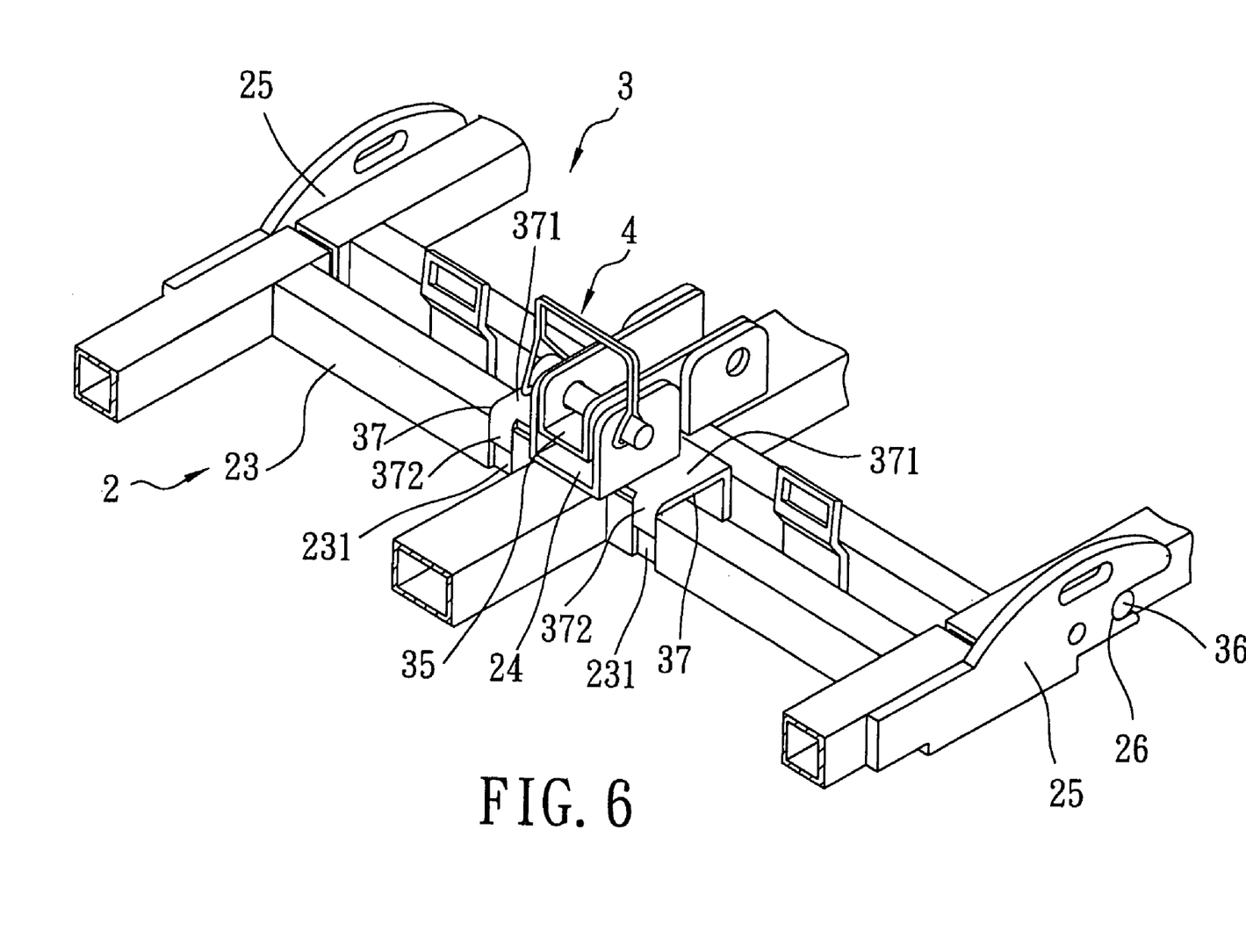
FIG. 6 is a fragmentary perspective view of the second preferred embodiment in an assembled state.

With further reference to FIG. 6, when it is desired to connect the first and second chassis members 2, 3, the first and second chassis members 2, 3 are brought toward each other such that the projection unit 36 is received in the groove unit 26, such that the second end portion of the second connector 35 is received in the accommodating space of the first connector 24, and such that the hook connectors 37 of the hook unit engage removably and respectively the notches 231 of the notch unit. In particular, as best shown in FIG. 6, the horizontal leg section 371 of each of the hook connectors 37 is disposed on a respective one of the left and right portions of the crossbar 23 of the first chassis member 2, and the vertical leg section 372 of each of the hook connectors 37 is received in a respective one of the notches 231. At this time, the hole unit 353 (see FIG. 2) in the vertical walls 352 of the second connector 35 is aligned with the hole unit 243 (see FIG. 2) in the vertical walls 242 of the first connector 24. Since the construction and operation of the locking device 4 are similar to those described hereinabove in connection with the first preferred embodiment, a detailed description of the same will be dispensed with herein for the sake of brevity.

Figure 7:
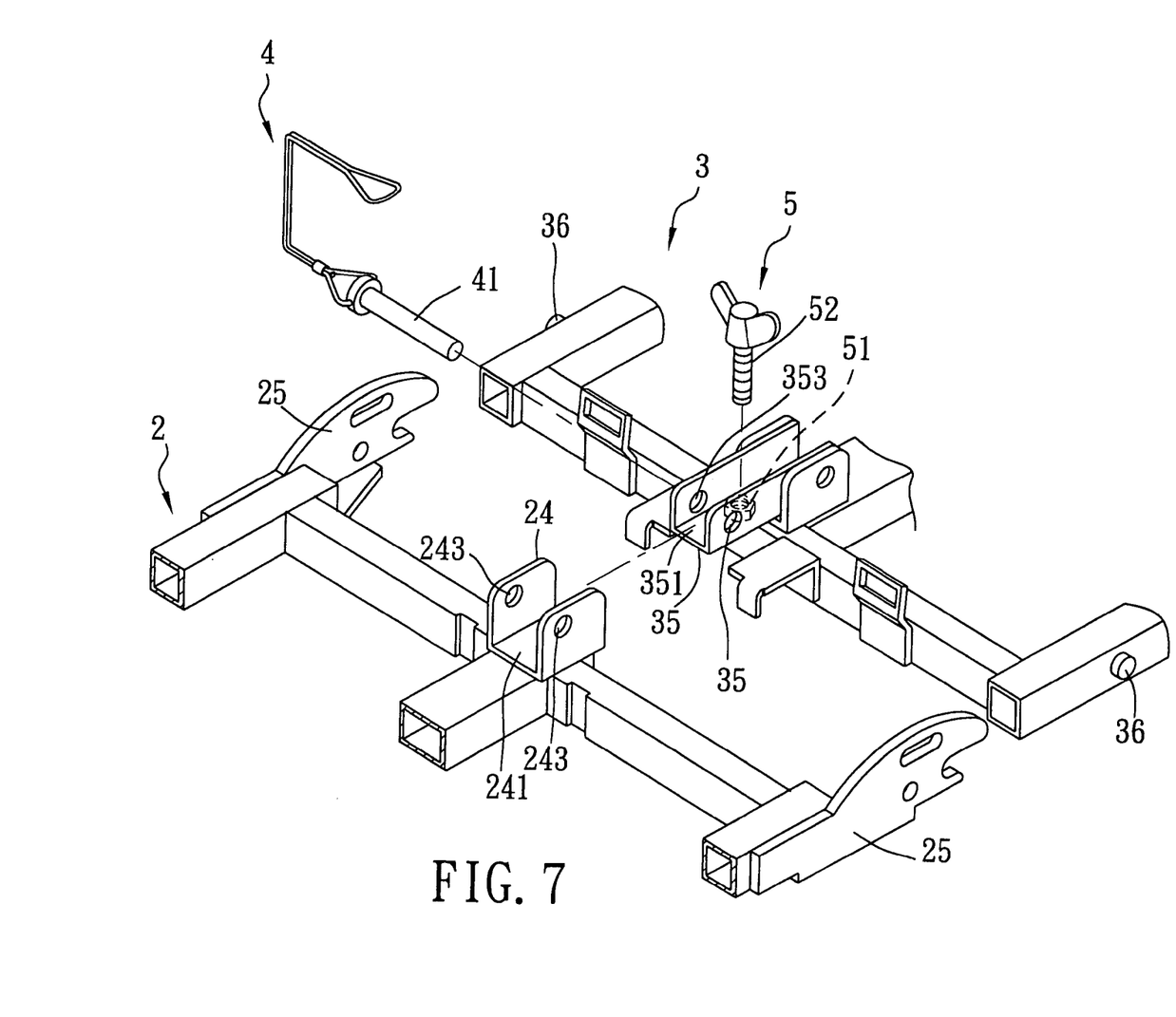
FIG. 7 is a fragmentary exploded perspective view of the third preferred embodiment of a vehicle chassis according to the present invention.

FIG. 7 shows the third preferred embodiment of a vehicle chassis according to this invention. This embodiment differs from the second embodiment in that the vehicle chassis further comprises a restricting member 5.

The restricting member 5 includes a nut 51 formed with a threaded hole, and a screw fastener 52. The horizontal wall 351 of the second connector 35 is formed with a hole therethrough. The hole in the horizontal wall 351 of the second connector 35 is formed in the second end portion of the second connector 35. The nut 51 is mounted on the horizontal wall 351 of the second connector 35 such that the threaded hole in the nut 51 is aligned with the hole in the horizontal wall 351 of the second connector 35.

Figure 8:
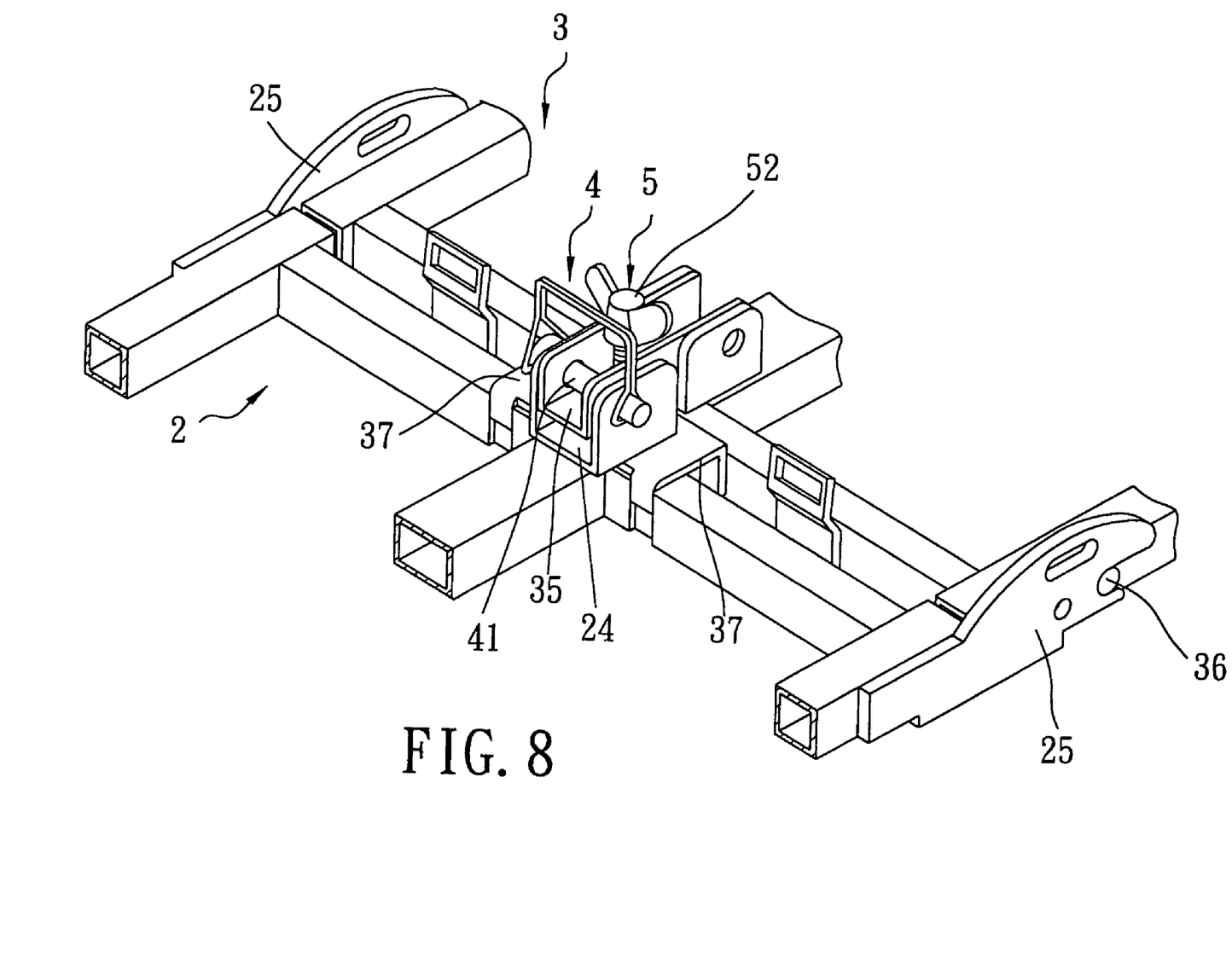
FIG. 8 is a fragmentary perspective view of the third preferred embodiment in an assembled state.
Figure 9:
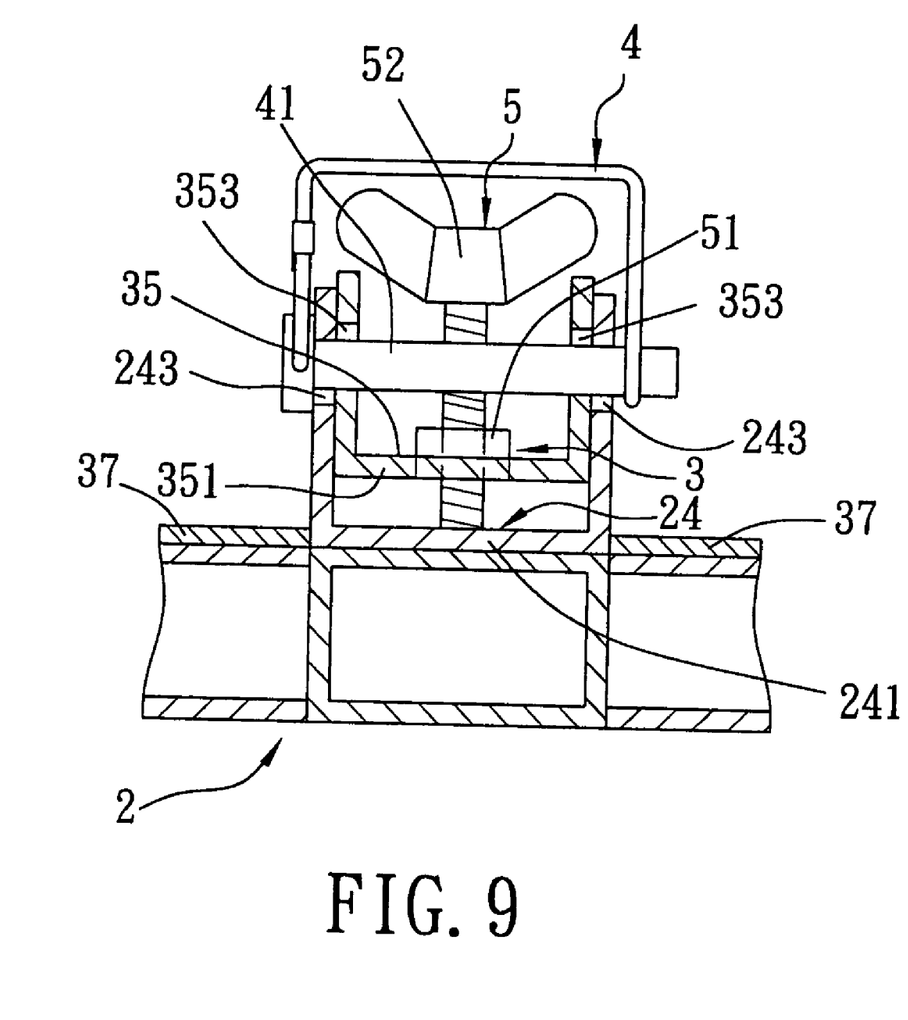
FIG. 9 is a fragmentary sectional view to illustrate a restricting member of the third preferred embodiment.

With further reference to FIGS. 8 and 9, after connecting the first and second chassis members 2, 3, as best shown in FIG. 8, the screw fastener 52 is threaded through the threaded hole in the nut and is driven such that a tip of the screw fastener 52 abuts against the horizontal wall 241 of the first connector 24, as best shown in FIG. 9. Further driving of the screw fastener 52 results in upward movement of the second connector 35 relative to the first connector 24 until each of the first and second connectors 24, 35 abuts firmly against the locking pin 41 of the locking device 4, thereby arresting movement of the first and second chassis members 2, 3 relative to each other.

It is noted that prior to extension of the locking pin 41 through the hole units 243, 353 in the vertical walls 242, 353 of the first and second connectors 24, 35, the restricting member 5 may be used to facilitate the alignment of the hole units 243, 353. In particular, when the first and second chassis member 2, 3 are brought toward each other such that the second end portion of the second connector 35 is received in the accommodating space of the first connector 24, such that the screw fastener 52 is threaded through the threaded hole in the nut 51, and such that the tip of the screw fastener 52 abuts against the horizontal wall 241 of the first connector 24, the screw fastener 52 may be driven so as to result in alignment of the hole units 243, 353.

It has thus been shown that the vehicle chassis 1 of this invention comprises a first chassis member 2 that includes a first connector 24 formed with a hole unit 243 therethrough, a second chassis member 3 that includes a second connector 35 formed with a hole unit 353 therethrough, and a locking device 4 that includes a locking pin 41 that is extended through the hole units 243, 353 and a retainer 42 that is latched releasably to one end of the locking pin 41. The construction as such permits easy and rapid connection and disconnection between the first and second chassis members 2, 3.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A vehicle chassis comprising:
   a first chassis member including a first connector formed with a hole unit therethrough, said first connector is generally U-shaped and has an accommodating space that opens upwardly;
   a second chassis member including a second connector formed with a hole unit therethrough, said second connector is generally U-shaped, and said second connector being disposed in said accommodating space of said first connector when said first and second chassis members are brought toward each other to align said hole units in said first and second connectors; and
   a locking device including
      a locking pin having a head end and a tail end opposite to said head end of said locking pin, and extending through said hole units in said first and second connectors, and
      a resilient retainer having a first end connected pivotally to said head end of said locking pin, and a second end opposite to said first end of said retainer and latched releasably to said tail end of said locking pin.

2. The vehicle chassis as claimed in claim 1, further comprising a groove unit formed in one of said first and second chassis members, and a projection unit formed on the other of said first and second chassis members, said projection unit being received in said groove unit when said first and second chassis members are brought toward each other to align said hole units in said first and second connectors.

3. The vehicle chassis as claimed in claim 1, further comprising a hook unit formed on one of said first and second chassis members, and a notch unit formed on the other of said first and second chassis members, said hook unit engaging removably said notch unit when said first and second chassis members are brought toward each other to align said hole units in said first and second connectors.

4. The vehicle chassis as claimed in claim 1, further comprising a restricting member for arresting movement of said first and second chassis members relative to each other, said restricting member including a threaded hole formed in said second connector, and a screw fastener threaded through said threaded hole and abutting against said first connector.

5. A vehicle chassis comprising:
   a first chassis member including a first connector formed with a hole unit therethrough;
   a second chassis member including a second connector formed with a hole unit therethrough, said second connector being disposed on said first connector when said first and second chassis members are brought toward each other to align said hole units in said first and second connectors;
   a locking device including
      a locking pin having a head end and a tail end opposite to said head end of said locking pin, and extending through said hole units in said first and second connectors, and
      a resilient retainer having a first end connector pivotally to said head end of said locking pin, and a second end opposite to said first end of said retainer and latched releasably to said tail end of said locking pin; and
      a restricting member for arresting movement of said first and second chassis members relative to each other, said restricting member including a threaded hole formed in said second connector, and a screw threaded through said threaded hole and abutting against said first connector.

6. The vehicle chassis as claimed in claim 5, further comprising a groove unit formed in one of said first and second chassis members, and a projection unit formed on the other of said first and second chassis members, said projection unit being received in said groove unit when said first and second chassis members are brought toward each other to align said hole units in said first and second connectors.

7. The vehicle chassis as claimed in claim 5, further comprising a hook unit formed on one of said first and second chassis members, and a notch unit formed on the other of said first and second chassis members, said hook unit engaging removably said notch unit, when said first and second chassis members are brought toward each other to align said hole units in said first and second connectors.

8. The vehicle chassis as claimed in claim 5, wherein said first connector is generally U-shaped and has an accommodating space that opens upwardly, said second connector being disposed in said accommodating space of said first connector when said first and second chassis members are brought toward each other to align said hole units in said first and second connectors.

* * * * *